UNITED STATES PATENT OFFICE.

GUSTAV H. DITTMAN, OF LAKE VIEW, ASSIGNOR TO THE ADAMS & WESTLAKE MANUFACTURING COMPANY, OF CHICAGO, ILLINOIS.

PROCESS OF DECORATING ZINC.

SPECIFICATION forming part of Letters Patent No. 318,882, dated May 26, 1885.

Application filed April 25, 1884. (Specimens.)

*To all whom it may concern:*

Be it known that I, GUSTAV H. DITTMAN, a citizen of the United States, residing at Lake View, in the county of Cook and State of Illinois, have invented certain new and useful Improvements in Processes of Decorating Zinc; and I do hereby declare that the following is a full, clear, and exact description of the invention, which will enable others skilled in the art to which it appertains to make and use the same.

My invention relates to the decoration of plates or sheets of zinc so as to make the ornamentation substantially permanent and adapt this metal for use in various places where it is not now employed, as well as to give it a more desirable and ornamental appearance in some places where it is now used.

I will proceed to describe in detail the several steps by which my new process is carried out in a practical way, and will then point out definitely in the claim the special improvements which I believe to be new and wish to protect by Letters Patent.

The plate or sheet of zinc is first carefully cleaned, and I then paint or print the ornamental design or picture upon one surface thereof in some suitable ink or paint which will protect the surface covered from action in the next step. Printers' ink will do for this purpose, but I do not wish to confine myself to it alone. After the design has been thus produced on the surface of the plate the plate is plunged into a bath of a solution composed of the following substances in the proportions substantially as follows, by weight: water, thirty-two parts; chloride of antimony, one part; chloride of copper, two parts. The effect of this solution upon the unprotected surface of the zinc will be to produce a black ground by a kind of electro-chemical action, making a deposit of antimony and copper. The ink or other substance in which the design is traced will not be affected, however, and will thoroughly protect the surface of the plate, which is covered thereby from any action of the solution. After remaining in the bath until the black ground is thoroughly formed on the surface, the plate is removed and fully dried, and is then placed in a second bath of turpentine, benzine, ether, or any other suitable liquid which will remove the ink or other material in which the design has been traced, but without affecting the black ground. When this tracing material has been completely dissolved or removed from the plate, the latter is taken from the bath and thoroughly dried. Obviously the design will now appear on the plate in the white surface of the metal, and upon a black ground, produced as described above. In order to protect the entire surface fully and to give it a more highly finished appearance the pictured side is now varnished over its entire surface, and after the varnish is dried the plates or sheets of zinc are ready for use. A decidedly neat effect is thus produced on a cheap metal, thus enabling me to give a durable ornamentation to zinc surfaces of almost any description, and by a process which is simple, cheap, and easily practiced.

Antimony may be used alone in preparing the bath for making the ground, if desired; but the ground obtained is not quite so permanent as when some copper is used; hence I prefer the solution compounded as stated above. I do not wish to be understood, however, as limiting myself to the exact proportions given in the formula above, as they may perhaps be varied somewhat; and I wish to be understood as including in my improvement the use of a solution having only the antimony. Furthermore, I wish it to be understood that I do not restrict myself to any particular material for removing the tracing of the design after the ground has been produced. It is immaterial what is used for this purpose, provided only that it is something which will readily wash out or remove the tracing material and without injury to the ground.

I am aware that it has been proposed to use a solution of chloride of antimony in alcohol, with the addition of hydrochloric acid, for the purpose of blackening the surface of zinc, the same to be applied by a brush or pencil, and I therefore lay no claim to the same.

Having thus described my invention, what I claim as new, and desire to protect by Letters Patent, is—

The herein-described process for decorating surfaces of zinc and protecting the decoration, the same consisting in, first, printing or painting the ornamental design upon the clean zinc surface in printers' ink or other suitable material; second, submitting this pictured surface to a bath in a solution of antimony or antimony and copper, substantially as specified in the formula; third, washing out or removing the ink or paint by which the design was made on the surface; and, fourth, covering the entire ornamented surface when dried with a suitable varnish, substantially as and for the purposes set forth.

GUSTAV H. DITTMAN.

Witnesses:
JNO. R. CALL,
A. M. BEST.